Nov. 26, 1929.  B. V. CLARK  1,737,451
TRANSMISSION GEAR
Filed Feb. 9, 1929
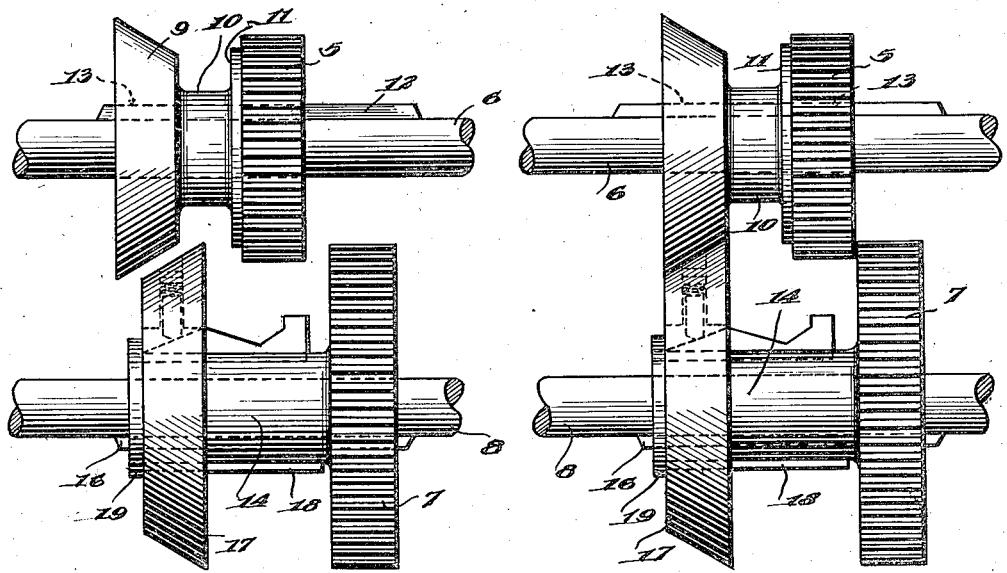
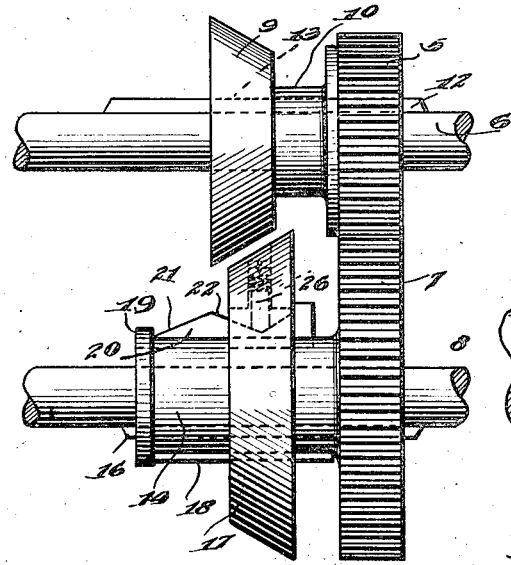
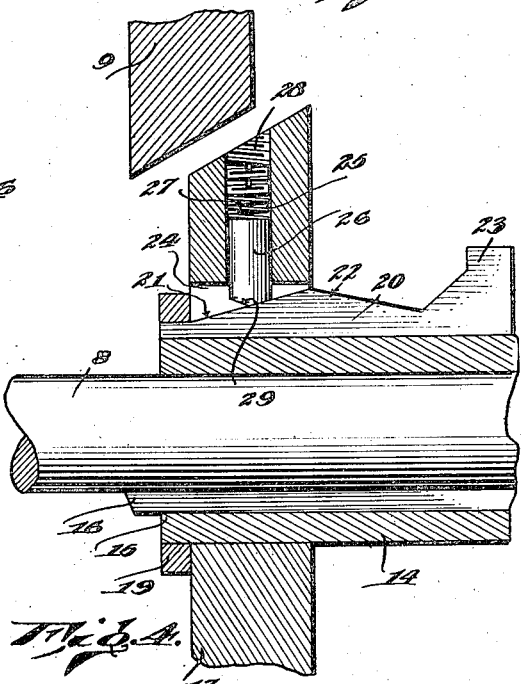
WITNESSES
INVENTOR
B. V. Clark,
BY
ATTORNEY Patented Nov. 26, 1929

1,737,451

UNITED STATES PATENT OFFICE

BAYLISS V. CLARK, OF ANNAPOLIS, MARYLAND

TRANSMISSION GEAR

Application filed February 9, 1929. Serial No. 338,712.

My invention relates to transmission gears for motor vehicles and an object of the same is to provide a transmission gearing wherein the driven shaft is caused to rotate at the same speed as the power shaft prior to engagement of a sliding gear with its corresponding or mating gear and thereby reduce gear clashing and resultant objections to a minimum.

Further the invention provides a gear transmission embodying a pair of cooperating toothed gears each of which is equipped with a friction gear through which power is transmitted from the power shaft to the driven shaft to cause both shafts to be driven at the same speed preparatory to engagement of the toothed gears.

With the preceding and other objects and advantages in mind the invention consists in the combination of elements, constructions and arrangement of parts and operations to be hereinafter specifically referred, claimed and illustrated in the accompanying drawings; wherein:

Fig. 1 is an elevation of my improved transmission gearing in neutral position;

Fig. 2 is a similar view illustrating the first step in actuating the gearing to mating relation;

Fig. 3 is a view similar to Figs. 1 and 2 and illustrating the gears in meshing relation; and Fig. 4 is an enlarged detail sectional view of parts of the mechanism.

While the invention is applicable to variable speed transmissions the same is herein disclosed as a single speed unit consisting of a sliding gear 5 mounted on a power shaft 6 and a driven gear 7 fixed to a driven shaft 8 arranged parallel to the drive shaft.

The sliding gear 5 is revoluble with a cone shaft friction gear 9 which is arranged in advance of the gear 5. The friction gear 9 is formed with a sleeve 10 upon its inner face terminating in an annular flange at one end which is welded or otherwise secured to the adjacent face of the gear 5. The gear 5 and associated friction gear 9 are keyed to the shaft 6 by a longitudinal key 12 formed on the shaft and passing through coinciding key ways 13 in the gears 5 and 9 respectively. In actual practice a conventional gear shifting fork will embrace the sleeve 10.

A hub 14 is formed centrally with one face of the gear 7 and projects laterally therefrom. This hub 14 is of a greater length than the sleeve 10 and is received on the shaft 8. The gear 7 and its hub 14 is provided with a continuous key way 15 which receives a longitudinally extended key 16 formed on the shaft 8 and is thereby fixed to rotate with this shaft.

In order to transmit power from the shaft 6 to the driven shaft 8 prior to meshing of the gears 5 and 7 a cone-shaped friction gear 17 is longitudinally movable on the sleeve 14. The friction gear 17 is arranged with its small end opposed to the large end of the friction gear 9 and is normally offset therefrom as disclosed in Fig. 1. A longitudinal key 13 extends the entire length of the sleeve 14 and engages the friction gear 17 to hold the same against rotation on the hub 14. The friction gear 17 is limited in its axial movement away from the gear 7 by means of an annular collar or shoulder 19 formed on the outer end of the hub.

For the purpose of shifting the friction gear 17 longitudinally incident to the movement of the friction gear 9 or the bevelled gear 5 a key 20 extends longitudinally of the sleeve 14 and is cast or otherwise secured thereto. The key 20 is formed with oppositely bevelled surfaces 21 and 22 and an upstanding extension or stop 23 at the rear end of the bevelled surface 22. A transverse opening 24 is provided in the friction gear 17 through which the key 20 passes.

A bore 24 is formed in the friction gear 17 and is arranged with its inner end communicating with the opening 25. A plunger 26 is slidably mounted in the bore 25 and is normally urged against the key 20 by an expansible coil spring 27 received in the bore and interposed between the plunger and a plug 28 held in the outer end of the bore. As particularly illustrated in Fig. 4 the lower end of the plunger is formed with a tapered end 29 to present surfaces which conform to either of the bevelled surfaces 21 or 22. In other words, with the plunger in the position disclosed in Fig. 2 one side of the bevelled end will contact with the bevelled surface 21 whereas when the friction gear 17 is in the position disclosed in Fig. 3 the opposite side of the bevelled end of the plunger will be in contact with the bevelled surface 22.

In the operation of the invention shifting of the sleeve 10 in one direction brings the friction gear 9 into driving engagement with the friction gear 17 to cause the driven shaft 8 to be rotated at the same speed as the power shaft 6. Continued movement of the sleeve 10 in this direction causes the friction gear 9 to pull the friction gear 17 axially away from the collar 19 until the plunger 26 occupies a position at the apex defined by the bevelled surfaces 21 and 22. By reason of the coil spring acting on the plunger 26 which is now in contact with the bevelled surface 22 the friction gear 17 will be urged axially out of engagement with the friction gear 9 and cause the bevelled gear 7 to engage the bevelled gear 5. When the sleeve 10 is actuated in a direction to disengage the gears 5 and 7 the gear 5 striking the friction gear 17 moves the latter axially until the plunger 26 occupies a position at the apex of the bevelled surfaces 21 and 22. The coiled spring 25 then acting on the plunger 26, now in contact with the bevelled surface 21 causes axial movement of the friction gear 17 and brings it to the initial position against the collar 19.

It will be observed that prior to engagement of the bevelled gears 5 and 7 the shafts 6 and 8 will be driven in synchronism so that when the gears 5 and 7 mesh there will be no tendency for clashing of the teeth thereon. Thus not only will the gears 5 and 7 mesh with comparative ease, but stripping of the gears and noise incident to engagement of the latter is reduced to a minimum.

What is claimed is:

1. In a transmission gearing, a drive shaft, a driven shaft arranged parallel thereto and equipped with a gear, a drive gear axially movable on the drive shaft, a friction gear carried thereby, a friction gear axially movable on the driven shaft and keyed thereto and engaged by the first mentionel friction gear upon axial shifting of the driven gear in one direction, a spring pressed plunger carried by the axially movable friction gear, and means cooperating with the plunger in resisting the movement of the axially movable gear and thereby cause the two shafts to be rotated in synchronism prior to meshing of the two gears.

2. In a transmission gearing, a drive shaft and a driven shaft arranged parallel thereto, a drive gear axially movable on the drive shaft, a friction gear movable therewith, a driven gear keyed to the driven shaft, an axially shiftable friction gear keyed on the driven shaft, means for temporarily resisting the driven friction gear against axial movement, whereby the two shafts will be rotated in synchronism through the friction gears prior to meshing of the drive gear with the driven gear upon shifting of the former in one direction, and means for shifting one of the friction gears out of engagement with the friction gear after the drive and driven gears are in mesh.

3. In a transmission gearing a drive shaft and a driven shaft arranged parallel thereto, a drive gear axially movable on the drive shaft, a friction gear movable therewith, a driven gear fixed to the driven shaft, an axially shiftable friction gear on the driven shaft, means for temporarily resisting the driven friction gear against axial movement, whereby the two shafts will be rotated in synchronism through the friction gears prior to meshing of the drive gear with the driven gear upon shifting of the former in one direction, and means for shifting one of the friction gears out of engagement with the friction gear after the drive and driven gears are in mesh, and means for returning said friction gear to normal position incident to the shifting of the drive gear in the reverse direction.

4. In a transmission gearing a drive shaft and a driven shaft arranged parallel thereto, an axially movable gear on the drive shaft, a friction gear fixed to one face thereof, a driven gear fixed to the driven shaft, a key extending longitudinally of the driven shaft and having oppositely enclined bevelled surfaces, an axially movable friction gear on the driven shaft, and through which the key passes, and a spring pressed plunger carried by the axially movable friction gear and bearing against the key, the spring pressed plunger causing axial movement of said friction gear after the latter has been moved axially a predetermined distance by the other friction gear or the gear to which it is attached.

5. In a transmission gearing a drive shaft and a driven shaft arranged parallel thereto, a drive gear axially movable on the drive shaft, a friction gear attached to one face thereof, a driven gear fixed to the driven shaft, a hub formed with one face of the latter, and axially movable friction gear keyed to the hub and adapted to be engaged by the first mentioned friction gear to cause both shafts to be rotated in synchronism initially, a key extending longitudinally of the hub and having oppositely inclined bevelled surfaces, and a spring pressed plunger carried by the last mentioned friction gear and cooperating with the bevelled surfaces in shifting such friction gear prior to and subsequent to the meshing of the drive and driven gears.

BAYLIES V. CLARK.